United States Patent [19]

Tsinberg et al.

[11] Patent Number: 5,734,784
[45] Date of Patent: Mar. 31, 1998

[54] HIGH DATA RATE SYSTEM AND METHOD FOR VIDEO RECORDING AND PLAYBACK

[75] Inventors: Mikhail Tsinberg, Riverdale, N.Y.; Kazuharu Niimura, Fukaya, Japan

[73] Assignee: Kabushiki Kaisha Toshiba, Kanagawa-ken, Japan

[21] Appl. No.: 468,389

[22] Filed: Jun. 6, 1995

Related U.S. Application Data

[63] Continuation of Ser. No. 236,143, May 2, 1994, abandoned, which is a continuation of Ser. No. 857,248, Mar. 25, 1992, abandoned.

[51] Int. Cl.⁶ .............................. H04N 5/91; H04N 5/917
[52] U.S. Cl. .............................. 386/81; 386/111
[58] Field of Search .................. 358/335, 342, 358/310, 312; 348/384, 397, 412, 415, 409; 386/81, 68, 109, 111, 112, 27, 33; H04N 7/12, 5/92, 5/91, 5/917

[56] References Cited

U.S. PATENT DOCUMENTS

| | | |
|---|---|---|
| 4,563,710 | 1/1986 | Baldwin . |
| 4,651,211 | 3/1987 | Weckenbrock et al. . |
| 4,680,766 | 7/1987 | Wilkinson . |
| 4,841,390 | 6/1989 | Yokosawa . |
| 4,845,562 | 7/1989 | Koslov et al. . |
| 4,870,510 | 9/1989 | Edakubo et al. ............... 358/312 |
| 4,897,722 | 1/1990 | Flory . |
| 4,916,553 | 4/1990 | Yoshioka et al. . |
| 4,969,055 | 11/1990 | Oberjatzas et al. ............ 360/32 |
| 5,021,880 | 6/1991 | Graves et al. . |
| 5,023,710 | 6/1991 | Kondo et al. ............... 358/133 |
| 5,040,060 | 8/1991 | Owada et al. . |
| 5,040,061 | 8/1991 | Yonemitsu ............... 358/135 |
| 5,045,853 | 9/1991 | Astle et al. . |
| 5,047,852 | 9/1991 | Hanyu et al. . |
| 5,057,932 | 10/1991 | Lang . |
| 5,083,206 | 1/1992 | Knauer et al. . |
| 5,093,720 | 3/1992 | Krause et al. . |
| 5,111,294 | 5/1992 | Asai et al. ............... 358/136 |
| 5,136,391 | 8/1992 | Minami ............... 386/33 |
| 5,140,637 | 8/1992 | Yonemitsu et al. ............... 358/342 |
| 5,365,380 | 11/1994 | Tanaka ............... 360/10.3 |

FOREIGN PATENT DOCUMENTS

| | | | |
|---|---|---|---|
| 6066272 | 3/1991 | Japan ............... | H04N 5/92 |

OTHER PUBLICATIONS

Onishi et al., "An Experiment Home–Use Digital VCR With Three Dimensional DCT and Superimposed Error Correction Coding," IEEE Transactions on Consumer Electronics, vol. 37, No. 3, Aug., 1991, pp. 252–260.

Yamamitsu et al., "A Study on Trick Plays for Digital VCR," IEEE Transactions on Consumer Electronics, vol. 37, No. 3, Aug., 1991, pp. 261–266.

(List continued on next page.)

*Primary Examiner*—Robert Chevalier
*Attorney, Agent, or Firm*—Finnegan, Henderson, Farabow, Garrett & Dunner, L.L.P.

[57] ABSTRACT

A video recording medium, video signal processor, and method are provided. The video signal processor includes a transcoder for receiving a video input signal comprising a plurality of input signal frames, each of the input signal frames including at least one of intraframe data and interframe data, and for constructing a corresponding plurality of system frames from the input signal frames, each of the system frames having a fixed length and including a first portion, having a first fixed length, including intraframe data and excluding interframe data, and a second portion, having a second fixed length, including interframe data and excluding intraframe data. By using a fixed system frame length, by using fixed lengths for the intraframe and interframe data segments, and by appropriately positioning these segments on respective recording tracks, the recording heads record only intraframe data from the sequential recording tracks as the heads diagonally traverse the tracks along their trick mode head trajectory during trick mode operation. The intraframe data thus read can be used directly to produce a display of a TV image which, although imperfect, is acceptable to the viewer.

43 Claims, 5 Drawing Sheets

OTHER PUBLICATIONS

Kim et al., "Bit Rate Reduction Algorithm for a Digital VCR," Transactions on Consumer Electronics, vol. 37, No. 3, Aug., 1991, pp. 267–274.

Yoneda et al., "An Experimental Digital VCR With New DCT–Based Bit–Rate Reduction System," IEEE Transactions on Consumer Electronics, vol. 37, No. 3, Aug., 1991, pp. 275–282.

Kobayashi et al., "Beyond 1 $\Omega m_2$/bit High Density Recording with Improved QAM Technique," IEEE Transactions on Consumer Electronics, vol. 37, No. 3, Aug., 1991, pp. 273–290.

General Instrument Corporation Videocipher Division, Digicipher HDTV System Description, Document No. TM 62004, Aug. 22, 1991.

FIG. 9

HIGH DATA RATE SYSTEM AND METHOD FOR VIDEO RECORDING AND PLAYBACK

This application is a continuation of application Ser. No. 08/236,143, filed May 2, 1994, now abandoned, which is a continuation of Ser. No. 07/857,248, filed Mar. 25, 1992, now abandoned.

BACKGROUND

1. Field of the Invention

The invention relates to high data rate methods and systems for recording and playback of composite video signals. More particularly, the invention relates to methods, systems, and recording media for recording and playback of composite video signals, for example, using a video cassette recorder (VCR) and a recording medium such as a magnetic recording tape.

2. Description of the Related Art

Technological advances in various fields allied to video recording have caused many researchers to focus on high resolution and high definition television (TV) systems, referred to here as HDTV systems. HDTV systems offer the advantages of extremely high picture quality, significantly larger TV displays, and high quality sound. The movement toward HDTV systems involves a transition from known analog TV systems to digital systems, essentially as has occurred in the audio field in moving from vinyl phonograph records to digital compact disc technology.

Analog TV systems, which include most of the TVs in use today, create the picture or TV image using a varying voltage that controls the position and characteristics of an electron beam. The electron beam is systematically swept across the internal side of the TV screen from left to right and down, much as a person reads English language print on a page. As the electron beam strikes the surface of the TV screen, light is produced which is seen collectively by the viewer as the TV image.

Analog TV technologies are inherently, limited in several respects. Probably the most important limitation is the inability to accurately detect and correct errors in the analog signal. The analog TV signal is broadcasted, for example, by a local TV station, as a radio wave with varying voltage. This broadcasted signal can be distorted by environmental or other disturbances prior to reaching the TV receiver. The signal also can be distorted in the TV circuitry. Because there is no reliable reference to detect and correct errors, these errors can produce imperfections or distortions in the resulting TV image.

Another limitation of analog TV systems is the practical limitation on the data rate, i.e., the effective rate at which the TV signal carries data or picture and sound information. Analog TV systems produce the TV image by rapidly projecting a series of still images or image frames, in essentially the same way a movie film is projected with a series of frames to create a moving picture. The analog TV signal is divided into segments or frames corresponding to the projected frames of the TV image. The full frame of the analog signal is necessary to construct the corresponding full TV image frame. It is difficult or impossible to transmit the analog frames in a more compact form, for example, by eliminating redundant information from frame to frame.

Digital TV systems overcome these limitations by using a digital signal that includes numerical data for each picture element or pixel of the TV image frame. The digital signal is segmented into a series of digital frames, with each frame including a series of numbers, ones and zeros, corresponding to the pieces of information in the frame. The organization of these pieces of data within the frame is referred to as the format of the frame. Parenthetically, a digital frame does not correspond one-for-one to a full frame of the TV image. Usually, one digital frame corresponds to only a relatively small portion of a TV image frame. The word "frame" as used in the remainder of this document refers to a digital frame unless otherwise indicated.

Digital technology offers a number of advantages, probably the most important of which is error detection and correction features. The information in the digital signal also can be processed to reduce or eliminate redundancies from frame to frame, and the digital information can be coded (using a single symbol or small group of symbols to represent a larger number or set of numbers) to increase the efficiency of the data transfer and correspondingly increase the data transfer rate. A processor in the digital TV set can be used to decode the data and use it to project the desired TV image. Techniques for increasing the efficiency of the data and correspondingly decreasing the redundancy are known as data compression techniques.

As a means to achieve desired high data rates, various data compression techniques have been proposed. Compression techniques involving "interframe coding" and "variable length coding" appear to be particularly attractive for digital video applications. Interframe coding involves reducing or eliminating frame-to-frame image redundancies by using motion vectors (numerical data representing motion in the TV image) and residual data (data representing the difference between the TV image constructed using motion vectors and the actual image data obtained from the camera during encoding) instead of fully reproducing the data of each frame. Variable length coding reduces or eliminates frame-to-frame redundancies in the data stream by using variable length digital codes instead of the actual data. With interframe and variable length coding, each digital frame includes two types or pieces of data—intraframe (IA) data and interframe (IR) data. IA data within a given frame is data that is unique to that frame. IR data is data that relates to or links two or more frames, e.g., from one frame to the next. Motion vector and residual data are examples of IR data. Using these types of techniques in digital TV applications, compression factors of about 30–40 have been reported. With these compression factors, signals, e.g., at 750 megabits per second (Mb/s) can be broadcasted as variable length coded and error protected data streams at data rates of 19–25 Mb/s.

Applying digital technology to VCR equipment, and particularly to VCR equipment that is practical for consumer markets, presents a number of challenges. Most importantly, the cost of the systems must be relatively low for market acceptability. The systems also must be able to perform "trick" modes (modes other than normal playback and record), such as various speeds of fast forward.

The helical scan mechanical recording systems of commercially available VCRs usually are the most expensive component of the VCR system, often by a significant margin. Commercially available helical scan systems used in most consumer VCRs today have a bandwidth of about 8–15 MHz, and can record or play back at rates up to about 35–40 Mb/s. These helical scan systems are designed to operate with analog TV signals, but they are capable of operating with digital signals as well, at least for data rates that are relatively low. Helical scan systems and rotary heads for VCR applications that are capable of operating at significantly higher speeds commensurate with the full digital signal transmission rates are available, but they are prohibitively expensive for consumer systems. Therefore, it is desirable to have a digital VCR system that uses commercially available, low cost helical scan systems or their substantial equivalents, but which operates at the highest practical data rate.

As used in VCRs of the current analog design, these commercially available, low cost helical scan systems perform trick modes by correspondingly changing the rotational speed of the heads and the translational speed of the recording tape. It is well known that, as the speeds change from the normal recording or playback speeds, the orientation of the moving heads relative to the recorded tracks on the tape cause the heads to scan past the tracks with a steep diagonal trajectory, rather than the desired playback trajectory. This disturbs the signal and the resulting image because the resulting signal comprises only the bits and pieces of adjacent analog frames, rather than the full frames. But because the analog frames recorded on the tracks of the tape are in analog form, these bits and pieces when combined are sufficient to produce an image that is acceptable to the viewer, although somewhat disrupted. This accounts for the horizontal lines that appear in the TV image during fast forward, for example.

When compressed digital signal formats with variable length coded data are used, standard rotary heads cannot read the data directly during trick modes. This is because the data within the frames is not predominantly the same from frame to frame as in analog signals. As the heads scan the bits and pieces of the digital tracks, they obtain an unusable mixture of IA and IR data from various frames. The bits and pieces, when used as a signal and displayed, do not produce an acceptable TV image.

OBJECTS OF THE INVENTION

Accordingly, an object of the invention is to provide an economical and adaptable system and method for recording and playback of high data rate digital video signals.

Another object of the invention is to provide an economical and adaptable system and method for recording and playback of high data rate digital video signals that is capable of producing an acceptable TV image during trick modes.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims.

SUMMARY OF THE INVENTION

To achieve the objects and in accordance with the purposes of the invention as embodied and broadly described in this document, a video signal processor is provided that includes a transcoder for receiving and operating on a video input signal. The input signal comprises a plurality of input signal frames. Each of the input signal frames includes at least one of IA data and IR data. The transcoder constructs a corresponding plurality of system frames from the input signal frames. Each of the system frames has a fixed length and includes a first portion, having a first fixed length, including IA data and excluding IR data, and a second portion, having a second fixed length, including IR data and excluding IA data. Preferably, the transcoder constructs the system frames so that the first portions of selected ones of the system frames lie along a trick mode head trajectory, or a plurality of trick mode head trajectories. The transcoder also may construct the system frames so that the second portions of selected ones of the system frames lie along a trick mode head trajectory, or a plurality of trick mode head trajectories.

According to another aspect of the invention, a video signal processor is provided that includes an inverse transcoder for receiving a plurality of the system frames, and for constructing a video output signal comprising a plurality of output signal frames corresponding to the plurality of system frames. Each of the output signal frames includes at least one of IA data and IR data. The system frames may and typically do include null data. Accordingly, the inverse transcoder removes the null data to construct the output signal frames as variable length frames.

The transcoder and inverse transcoder preferably are combined within a unitary digital VCR system that includes a recording helical scan system operatively coupled to the transcoder and to the inverse transcoder for writing and reading the system frames to and from a recording medium.

The invention further includes a method comprising the steps of receiving a video input signal as this input signal is described above, and constructing a corresponding plurality of system frames, as these system frames also are describe above, from the input signal frames. The system frame constructing step preferably includes constructing the system frames so that the first portions of selected ones of the system frames lie along a trick mode head trajectory, or a plurality of trick mode head trajectories. The system frame constructing step also may include constructing the system frames so that the second portions of selected ones of the system frames lie along a trick mode head trajectory, or a plurality of trick mode head trajectories.

According to another aspect of the invention, a method is provided that comprises the steps of receiving a plurality of system frames as these system frames are described above, and constructing a video output signal, as this video output signal also is described above.

According to still another aspect of the invention, a video recording medium is provided for recording a video signal including at least one of IA data and IR data. The recording medium comprises a recording surface having a plurality of recording tracks. The recording tracks comprise a plurality of system frames. Each of the system frames is of a fixed length and includes a first portion, having a first fixed length, including IA data and excluding IR data, and a second portion, having a second fixed length, including IR data and excluding IA data.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

DETAILED DESCRIPTION OF THE PREFERRED EMBODIMENTS AND METHODS

Reference will now be made in detail to the presently preferred embodiments and methods of the invention as illustrated in the accompanying drawings, in which like reference characters designate like or corresponding parts throughout the drawings.

In accordance with the invention, a video signal processor is provided that comprises a transcoder for receiving a video input signal. The video input signal comprises a plurality of input signal frames. Each of the input signal frames includes at least one of IA data and IR data. The transcoder constructs a corresponding plurality of system frames from the input signal frames. Each of the system frames has a fixed length and includes a first portion, having a first fixed length, including IA data and excluding IR data, and a second portion, having a second fixed length, including IR data and excluding IA data.

Figure 1:
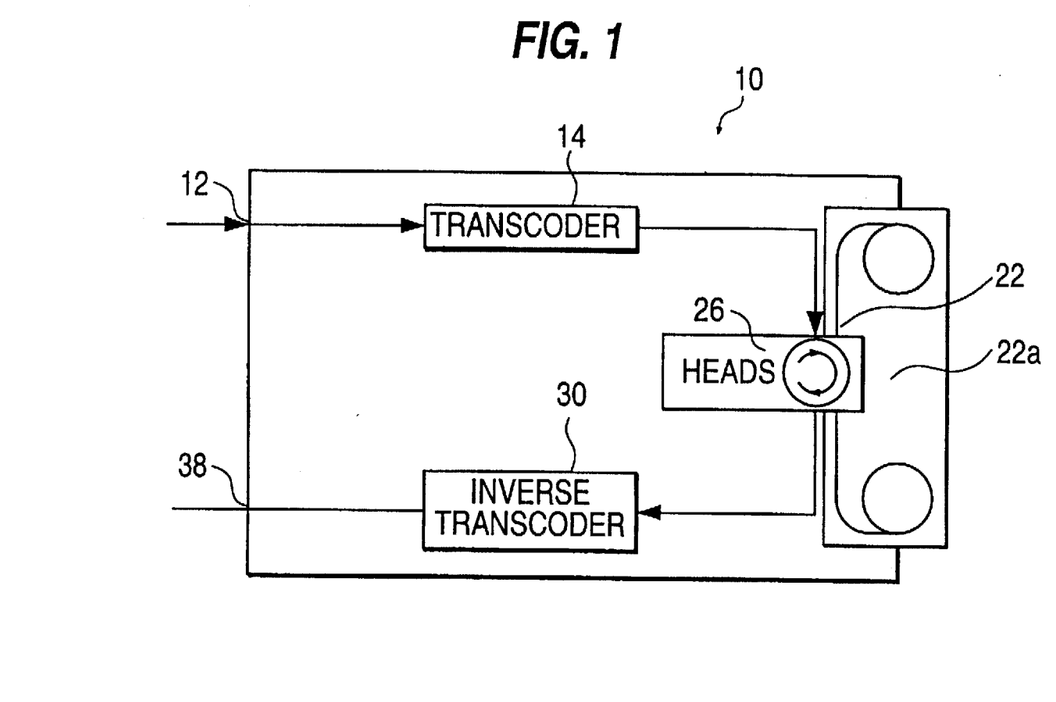
FIG. 1 is a diagram of a digital VCR system that includes a transcoder, an inverse transcoder, and recording heads according to preferred embodiments of the invention.
Figure 2A:
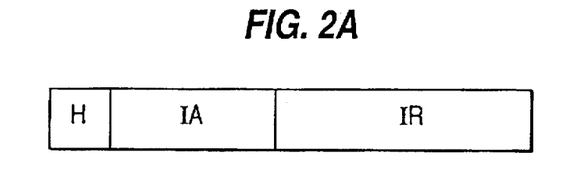
FIGS. 2A and 2B are diagrams of sample variable length coded digital video signals of the type that are inputted into and outputted out of the VCR system of FIG. 1.
Figure 2B:
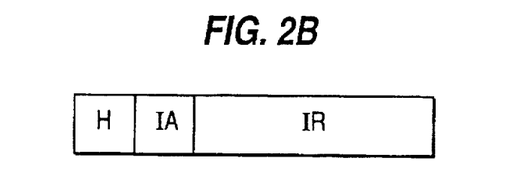

A block diagram of a digital VCR 10 according to a preferred embodiment of the invention is shown in FIG. 1. VCR 10 includes an input terminal 12 for receiving an interframe coded and variable length coded digital video input signal. The video input signal or input signal comprises a digital data stream, e.g., at a 25 Mb/s data rate, that includes a plurality of input signal frames, each representing compressed video data. Each of the input signal frames includes at least one of IA data and IR data. Examples of such a digital input signal are shown in FIGS. 2A and 2B. With reference to FIG. 2A, a typical frame includes header information H, IA data, and IR data, in that order. The header information, for example, may comprise about one Mb/s of data, the IA portion may comprise about ten Mb/s, and the IR portion may comprise about 20 Mb/s. As explained above, the lengths of the IA and IR data portions typically will vary from frame to frame, depending upon the amount of detail in the corresponding part of the TV image, the nature and extent of motion, the aspect, etc. For example, the frame of FIG. 2A may be followed by the frame of FIG. 2B, which includes the same amount of header information, but which includes significantly less IA data and slightly less IR data.

Figure 3:
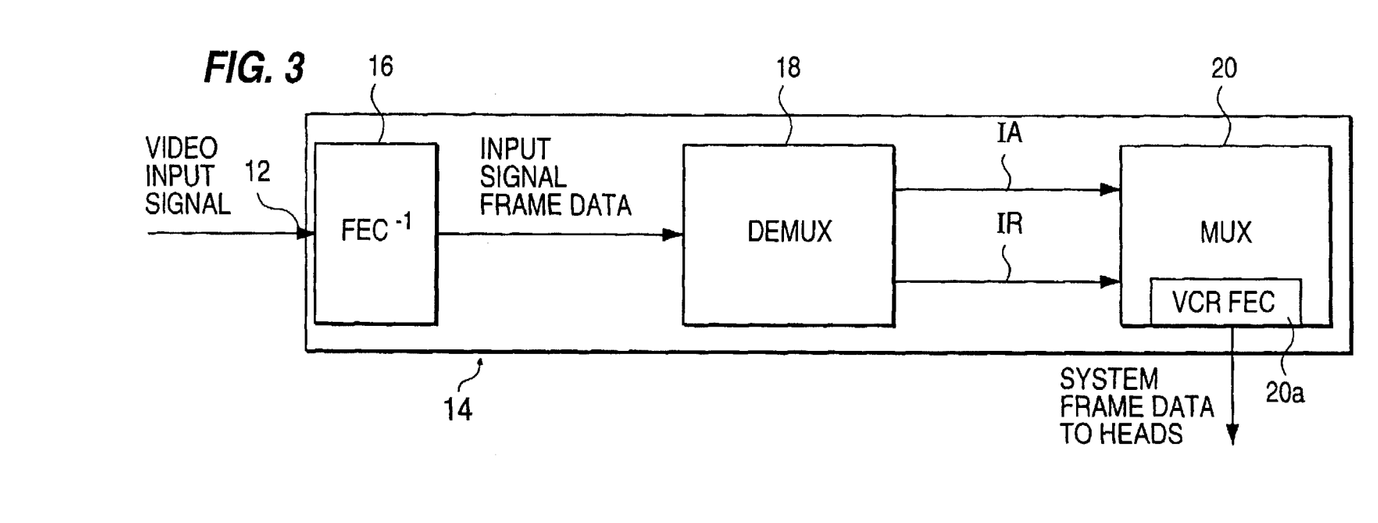
FIG. 3 is a block diagram of the transcoder shown in FIG. 1.

In accordance with the preferred embodiment, a transcoder 14 is provided for receiving the input signal, and for constructing a corresponding plurality of system frames from the input signal frames. A block diagram of transcoder 14 is shown in FIG. 3. Transcoder 14 includes an inverse forward error correction processor (FEC$^{-1}$) 16, a demultiplexer 18, and a multiplexer 20. Processor 16 is operatively coupled to input terminal 12 to receive the input signal. Processor 16 performs forward error correction of the input signal, e.g., according to known methods such as a Reed Solomon error correction method. The output of processor 16 is a forward error corrected video portion of the input signal comprising a digital data stream with a data rate of about 20 Mb/s.

Demultiplexer 18 is operatively coupled to processor 16 for demultiplexing and separating the output of processor 16 into IA data and IR data for each of the input signal frames in the signal outputted by processor 16. Demultiplexer 18 is a commercially available component, e.g., and performs the demultiplexing operation as described below. The output of demultiplexer 18 is an IA data stream with a data rate of about 2–10 Mb/s, and a separate IR data stream with a data rate of about 10–20 Mb/s. The maximum data rate for the IA data stream typically is about 10 Mb/s, and the maximum for the IR data stream typically is about 20 Mb/s. The significance of these figures will be discussed below. The data is outputted in a manner that enables the IA and IR data to be correlated to a given input frame, e.g., using flags in the header in a known manner.

Multiplexer 20, which is operatively coupled to demultiplexer 18, time division multiplexes the IA and IR data streams from demultiplexer 18 to construct a plurality of system frames corresponding to the input signal frames. Multiplexer 20 also is a commercially available component, e.g., and operates as described below to construct the system frames. A VCR forward error correction processor 20a, e.g., of known design, is provided at the output of multiplexer 20 to perform forward error correction of the outputted signal, e.g., using Reed Solomon techniques and dispersing techniques in a known manner.

Figure 4:
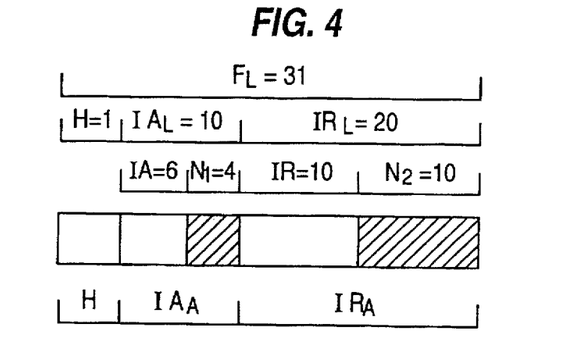
FIG. 4 is a diagram showing the structure of a sample system frame as used in accordance with the preferred embodiments and preferred methods of the invention.

An example of a system frame is shown in FIG. 4. This frame is assumed to have a one second length or duration. In accordance with the preferred embodiments and methods, each of the system frames has a fixed length $F_L$, e.g., of 35 megabit (Mb). The sample system frame includes a header portion H, e.g., of 1 Mb. The system frame also includes a first portion IA$_A$, having a first length IA$_L$, e.g., of 10 Mb. This first portion, which constitutes an IA data allocation or IA segment, includes IA data and excludes IR data. This 10 Mb segment length corresponds to the maximum amount of IA data expected to be present in any of the input signal frames. The system frame further includes a second portion IR$_A$, having a second fixed length IR$_L$, e.g., of 20 Mb, corresponding to the maximum expected amount of IR data in any of the input signal frames. The second portion, which constitutes an IR data allocation or IR segment, includes IR data and excludes IA data.

Because the IA and IR data of a given input signal frame of one second length almost always have less data than the respective first and second portions of the corresponding system frame, filter data in the form of null data, such as zeros, is added to fill the remainder of the system frames. For example, with reference to FIG. 4, the IA portion of the sample frame has a length of 10 Mb, but the corresponding input signal frame includes only 6 Mb of IA data. Accordingly, 4 Mb of zeros are added as null data N$_1$ to fill the IA portion of the system frame. Similarly, the IR portion of the sample frame has a length of 20 Mb, but the corresponding input signal frame includes only 10 Mb of IR data. Therefore, 10 Mb of zeros are added as null data N$_2$ to fill the IR portion of the system frame.

The length of the system frames will depend on the specific application, and to a certain extent involves a matter of design choice. For example, each recording track may include one system frame, or each recording track may include any positive integer number of system frames.

The problem of using trick modes with interframe coded and variable length coded digital signals was described above. This limitation is overcome with the present invention by constructing the system frames to have fixed length, and by positioning the IA portions of the system frames along the trick mode trajectory of the heads. The trick mode head trajectory refers to the path on the surface of the recording tape along which the heads move during trick mode operation. The specific trajectory will depend on the alignment of the tape relative to the heads, and upon the relative speeds of the heads and the tape. It may be a straight line, or it may be non-linear. When the trick mode head trajectory is superimposed on the recording tracks of the tape, the heads will traverse the tracks in a steep diagonal fashion (FIGS. 5 and 6), rather than in a normal diagonal fashion as they would during normal playback operation. The points at which the heads traverse the recording tracks and the data collected at these points are referred to as bits and pieces.

By using a fixed system frame length, by using fixed lengths for the IA and IR data segments, and by appropriately positioning these segments on the respective recording tracks, the heads receive only IA data from the sequential recording tracks as the heads diagonally traverse the tracks along their trick mode head trajectory during trick mode operation. Referring to the "bits and pieces" analogy of analog VCR operation, the bits and pieces read by the heads during trick mode operation comprise solely IA data. Preferably, the IA data thus read can be used directly to produce a display of the TV image which, although imperfect as in the analog VCR example, is acceptable to the viewer.

Referring again to the preferred embodiment of FIG. 1, transcoder 14 constructs the system frames so that the first portions of selected ones of the frames lie along a trick mode head trajectory. The manner in which transcoder 14 constructs the system frames perhaps can best be understood in conjunction with the description of a video recording medium in accordance with another aspect of the invention.

In accordance with this aspect of the invention, the video recording medium is useful for recording a video signal such as the signal outputted by transcoder 14. The video signal includes at least one of IA data and IR data. Preferably, the recording medium comprises a recording surface having substantially parallel first and second edges, and a plurality of recording tracks extending on the surface between the first and second edges at a non-perpendicular angle from the first and second edges. The recording tracks comprise a plurality of system frames, each of the system frames being of a fixed length and including a first portion, having a first fixed length, including IA data and excluding IR data, and a second portion, having a second fixed length, including IR data and excluding IA data.

Figure 5:
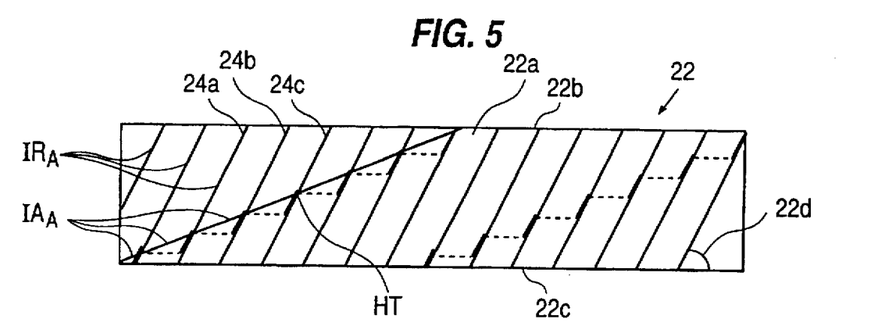
FIG. 5 is a diagram of a preferred recording medium according to the invention.

A preferred embodiment of a recording medium according to this aspect of the invention is shown in FIG. 5. The recording medium of this preferred embodiment comprises a magnetic tape 22, e.g., of the type currently in common use with analog VCR systems. Tape 22 includes a recording surface 22a having substantially parallel first and second edges 22b and 22c. A plurality of recording tracks 24a, 24b, 24c, . . . extend on surface 22a between edges 22b and 22c at a non-perpendicular angle from these edges, e.g., at an angle 22d of about 75°–80°. During normal recording and playback modes, the heads traverse the tape at angle 24d to respectively form or follow tracks 24a, 24b, 24c, . . . . Recording tracks 24a, 24b, 24c . . . comprise a plurality of system frames as these systems frames have been described above. The system frames have a common fixed length $F_L$, and each of the frames has an IA portion $IA_A$ of a first fixed length $IA_L$ and an IR portion $IR_A$ of a second fixed length $IR_L$. During trick mode playback, the heads traverse the tape to form a trajectory which traverses rather than follows tracks 24a, 24b, 24c, . . . .

In this embodiment, the first or IA portions of selected ones of the system frames lie along a trick mode head trajectory. As the example in FIG. 5 shows, each recording track includes only a single system frame. The selected ones of the system frames in the example are the set of sequential system frames on the left half of the tape segment shown in FIG. 5. These system frames lie along tracks 24a, 24b, 24c, . . . to lie along trick mode head trajectory HT, which in this example constitutes a straight line trajectory.

Given this positioning of the IA portions of the system frames, the heads, when reading tape 22 in the trick mode corresponding to trick mode head trajectory HT, read only IA data. The signal thus read can be communicated directly to a display device to display a somewhat distorted but acceptable TV image. In this manner, the recording medium allows the significant advantages of digital technology to be used, and also provides a trick mode capability.

Other embodiments of a recording medium for the present invention may also be employed. For example, the recording medium may comprise magneto-optical or other recording material, and may comprise rotating media or media in a card format.

Referring again to FIG. 3, multiplexer 20 constructs a plurality of system frames, each of which is according to the structure shown in FIG. 4. Multiplexer 20 adds null data to the respective IA and IR portions as is necessary to fill these portions of each of the system frames. Multiplexer 20 also positions the system frames sequentially to produce a signal in VCR format (a format readable by a helical scan system such as the helican scan systems used in current analog VCR systems). The VCR formatted signal is forward error corrected by processor 20a, e.g., in a known manner, and the signal is outputted as a data stream with a data rate, e.g., of about 40 Mb/s.

Referring again to the preferred embodiment of FIG. 1, a helical scan system 26 is operatively coupled to the output of transcoder 14 to receive the forward error corrected and VCR formatted signal from transcoder 12. The heads of helical scan system 26 record the signal from transcoder 14 to recording tape 22 in normal record mode so that the frames are positioned on tape 22 as shown in FIG. 5.

Figure 6:
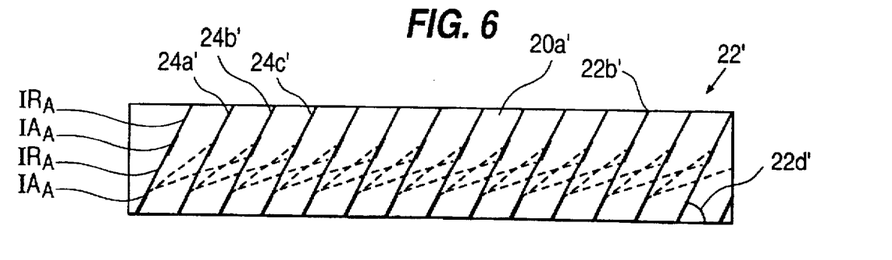
FIG. 6 is a diagram of another preferred recording medium according to the invention.

The video signal processing system of FIG. 1 and the tape of FIG. 5 as thus far described provide the VCR system with a trick mode capability, but only at a single trick mode speed. In a modification to the previously described embodiments, however, the processor and recording medium can enable the VCR system to operate in a plurality of trick modes. To achieve this feature, the first portions of selected ones of the system frame are positioned along tracks 24a', 24b' and 24c', . . . to lie along a plurality of trick mode head trajectories. For example, FIG. 6 shows a recording medium, here a magnetic recording tape 22', that includes two system frames per recording track, rather than a single system frame per recording track. The IA segments of the system frames of adjacent recording tracks are positioned so that, for either of two trick mode head trajectories corresponding to two unique trick mode speeds, the recording heads traverse the tracks at IA portions during the trick mode separation. In this manner, two trick mode speeds can be achieved while continuing to provide an acceptable TV image. Additional trick modes can be similarly provided by appropriately positioning the IA portions.

The previous description has indicated that the first portions, the IA portions, of selected ones of the system frames lie along the trick mode head trajectory or trajectories, providing an uninterrupted stream of IA data in the trick mode. It could be advantageous in some instances, however, for the second portions, the IR portions, to lie along the trick mode head trajectory or trajectories. For example, if one assumes that system frame data has been stored by a processor (not shown) of the VCR system, and that one wishes to change the TV image in predetermined ways during trick mode operation solely according to motion vector or other IR information in other frames, it may be desirable for the heads to read only IR data. In these instances, the positioning of the second or IR portions of the system frames along the trick mode head trajectory or trajectories would provide the desired data for producing an acceptable TV image during trick mode operation.

In accordance with another aspect of the invention, a video signal processor is provided that comprises an inverse transcoder for receiving a plurality of system frames, each of the system frames having a fixed length and including a first portion, having a first fixed length, including IA data and excluding IR data, and a second portion, having a second fixed length, and including IR data and excluding IA data, and for constructing a video output signal comprising a plurality of frames corresponding to the plurality of system frames, each of the output signal frames including at least one of IA data and IR data.

Figure 7:
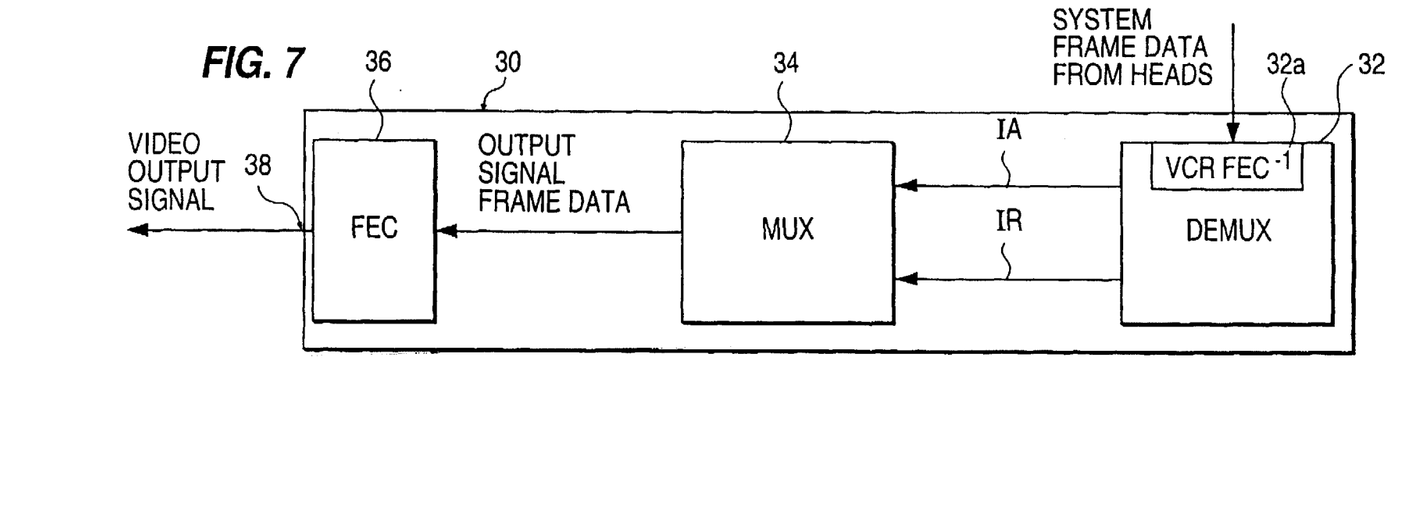
FIG. 7 is a block diagram of the inverse transcoder shown in FIG. 1.

In accordance with the preferred embodiment of FIG. 1, an inverse transcoder 30 is provided that, as shown in FIG. 7, includes a demultiplexer 32, a multiplexer 34, and a forward error correction processor 36. An output terminal 40 is operatively coupled to processor 36 to output the signal from processor 36, e.g., to a digital HDTV set. Demultiplexer 32 is operatively coupled to helican scan system 26 to receive the signal outputted by helical scan system 26 during playback. The signal that is communicated from helical scan system 26 to inverse transcoder 30 is a VCR-formatted digital data stream comprising a sequence of system frames as recorded on recording tape 22 or 22'. The signal has a data rate of about 40 Mb/s.

Demultiplexer 32 includes a VCR inverse forward error correction processor 32a for removing forward error correction codes from the signal received from head assembly 26 and detecting and correcting errors. After processing by processor 32a, demultiplexer 32 demultiplexes or separates the first and second portions of the system frames, i.e., the IA and IR data, respectively, for each of the system frames. Demultiplexer 32, in addition to separating the IA and IR data, removes the null data that was inserted into the IA and IR segments of the system frames by multiplexer 20. Demultiplexer 32 preferably is a commercially available component, and operates essentially in a known manner to separate the data. Demultiplexer 32 outputs separate IA and IR data streams, but retains the identity of the respective IA and IR portions corresponding to the system frames, e.g., by appropriate flags in the header. The IA data stream has a data rate of about 2–20 Mb/s, and the IR data stream has a data rate of about 10–20 Mb/s.

Multiplexer 34 is operatively coupled to demultiplexer 32 for receiving the IA and IR data streams and time division multiplexing the first and second portions of each of the system frames into corresponding output signal frames. Multiplexer 34 preferably is of a known design, and multiplexes the data in a known manner to produce a single video output signal comprising output signal frame data in a data output stream with a data rate of about 20 Mb/s. This output signal is a VCR error corrected video signal. The signal is interframe coded and variable length coded so that it has the structure of the variable length frames shown in FIGS. 2A and 2B.

Processor 36 receives the output of multiplexer 34 and performs forward error correction processing on the signal in a known manner such as described above to produce a video output signal. The video output signal comprises a plurality of output signal frames corresponding to the plurality of system frames read from tape 22 by helical scan system 26, but in the format of the input signal that is communicated from processor 16 to demultiplexer 18. Each of the output signal frames includes at least one of IA data and IR data, as described above, and therefore constitutes a variable length frame as shown in FIGS. 2A and 2B. The video output signal outputted by inverse transcoder 30 comprises a digital data stream of variable length coded and error protected data having the same format as the video input signal inputted into transcoder 14, and having a data rate of about 25 Mb/s.

Preferred methods according to the invention now will be described. For ease of illustration, the preferred method will be described with reference to the preferred video signal processors, VCR system, and recording media described above. It will be understood, however, that the methods of the invention are not limited to these embodiments.

In accordance with the invention, a method is provided that comprises the steps of receiving a video input signal comprising a plurality of input signal frames, each of the input signal frames including at least one of IA data and IR data, and constructing a corresponding plurality of system frames from the input signal frames, each of the system frames having a fixed length and including a first portion, having a first fixed length, including IA data and excluding IR data, and a second portion, having a second fixed length, including IR data and excluding IA data. The input signal receiving step preferably includes demultiplexing the IA data and the IR data for each of the input signal frames, and the system frame constructing step preferably includes time division multiplexing the IA data and the IR data into the corresponding system frames. The system frame constructing step also preferably includes constructing the system frames so that the first portions of selected ones of the system frames lie along a trick mode head trajectory, or a plurality of trick mode head trajectories.

Figure 8:
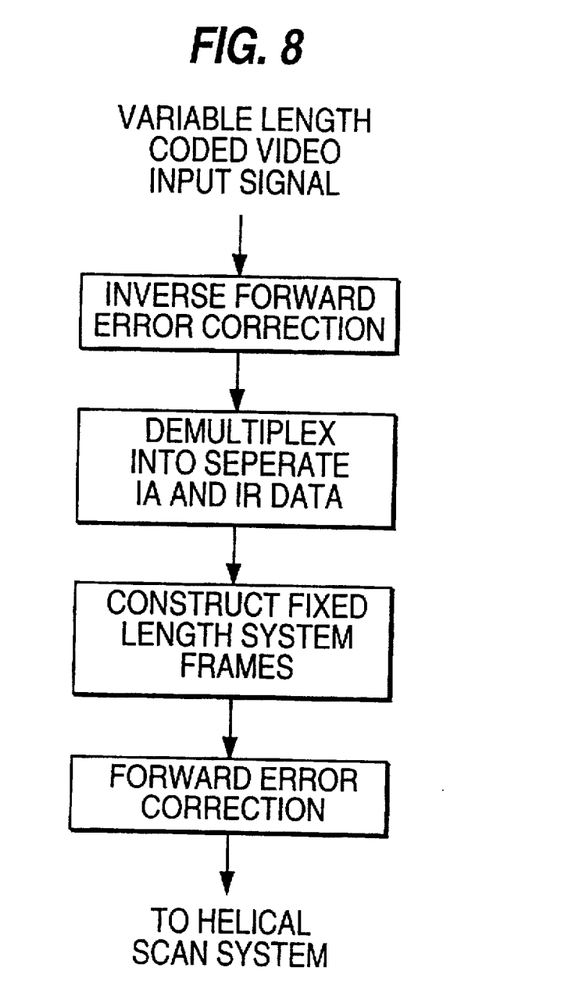
FIG. 8 is a flow chart that illustrates a preferred recording method according to the invention.

A preferred method that implements this aspect of the invention, which method corresponds to an application of VCR 10 (FIG. 1) in writing or recording a video input signal inputted at terminal 12 and recorded onto tape 22 or 22', is illustrated in FIG. 8. In accordance with this method, a video input signal such as a digital video input signal comprising a variable length coded and error protected data stream with input signal frame corresponding to those of FIGS. 2A and 2B is inputted into terminal 12 of transcoder 14, e.g., at a data rate of 25 Mb/s. Processor 16 (FIG. 3) performs inverse forward error correction and outputs the video portion of the input signal comprising input signal frame data. This signal is received by demultiplexer 18, which demultiplexes the input signal frame data into separate IA and IR data streams. These IA and IR data streams are communicated to multiplexer 20, which constructs a corresponding plurality of system frames, each of which corresponds to the system frame format shown in FIG. 4. Multiplexer 20 inserts null data into the $IA_A$ and $IR_A$ segments of each frame to fill each frame, thereby forming fixed length system frames. These system frames are outputted in a sequence corresponding to the frame sequence of the input signal, processor 20a performs known forward error correction on the data stream, and the resulting VCR formatted data stream is outputted from transcoder 14, e.g., at a data rate of about 40 Mb/s.

The system frames and the IA portions of the system frames; are positioned in the data stream so that their positioning, when recorded on tape 22, corresponds to the recorded tape configuration shown in FIG. 5. The positioning of the system frames and IA portions of the frames also may be configured according to the tape shown in FIG. 6.

The signal outputted from transcoder 14 is communicated to helican scan system 26, which records the system frame data stream onto tape 22 or 22'. In this manner, the system frames of the data stream received by helical scan system 26 are constructed so that the IA portions of selected ones of the system frames lie along the trick mode head trajectory (e.g., FIG. 5) or trajectories (e.g., FIG. 6).

The system frame constructing step also may include constructing the system frames so that the second or IR portions of selected ones of the frames lie along a trick mode head trajectory or a plurality of trick mode head trajectories. For example, as explained above, there may be instances in which it is desirable for the heads of helical scan system 26 to read only IR data.

Figure 9:
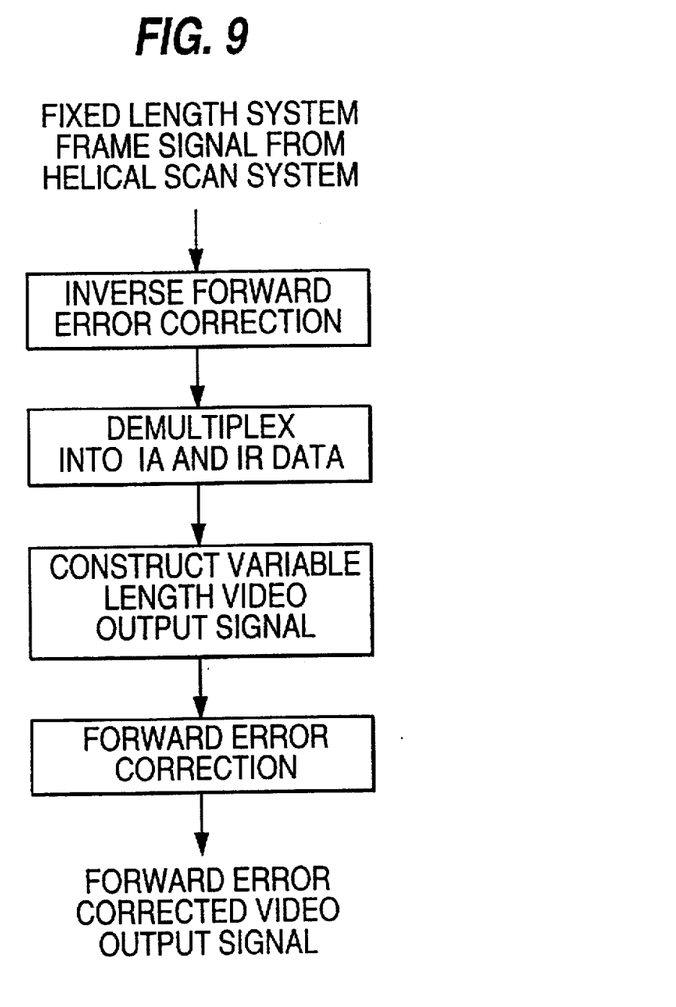
FIG. 9 is a flow chart that illustrates a preferred playback method according to the invention.

In accordance with another aspect of the method of the invention, a method is provided that comprises the steps of receiving a plurality of system frames, each of the system frames having a fixed length and including a first portion, having a first fixed length, including IA data and excluding IR data, and a second portion, having a second fixed length, including IR data and excluding IA data, and constructing a video output signal comprising a plurality of output signal frames corresponding to the system frames, each of the output signal frames including at least one of IA data and IR data. The output signal constructing step preferably includes separating the first and second portions for each of the system frames, and time division multiplexing the first and second portions of each of the system frames into the, corresponding output signal frames. Because the system frames typically include null data, the output signal constructing step also preferably includes removing this null data to construct the output signal frames as variable length frames. A preferred method to illustrate this aspect of the invention is provided when VCR 10 (FIG. 1) is used to play back the system frame signal recorded on tape 22 as described immediately above. This preferred method is illustrated in FIG. 9.

In accordance with this preferred method, the heads of helical scan system 26 read the recorded system frame signal as recorded on tape 22 or 22'. The signal thus generated is communicated from head assembly 26 to inverse transcoder 30, where it is received at demultiplexer 32. Processor 32a performs inverse forward error correction processing, e.g., in a known manner as described above, to produce a VCR formatted data stream comprising sequential system frames, e.g., at a data rate of about 40 Mb/s. Demultiplexer 32 demultiplexes or separates the system frame signal into separate IA and IR data streams, and removes the null data from each of the IA and IR portions. The IA data is outputted from demultiplexer 32 to multiplexer 34, e.g., at a data rate of about 2–10 Mb/s. In a separate data stream, the IR data is outputted from demultiplexer 32 to multiplexer 34, e.g., at a data rate of about 10–20 Mb/s. The system frame origin of the IA and IR data are preserved, e.g., by appropriate flags in the header, so that they may be matched in subsequent processing. Multiplexer 34 time division multiplexes the IA and IR data to produce video output signal frames corresponding to the system frames. This multiplexing operation may be performed essentially in a known manner to construct a VCR error corrected digital video data stream. The variable length coded data stream is outputted from multiplexer 34 at a data rate, e.g., of about 20 Mb/s. Processor 36 receives the output signal, which comprises output signal frame data as shown in FIGS. 2A and 2B, from multiplexer 34, performs forward error correction processing, e.g., in a known manner as described above, and outputs a variable length coded and error protected digital video output signal data stream, e.g., at a data rate of about 25 Mb/s. This outputted data stream can be communicated to a digital TV to produce a TV image corresponding to the information recorded on tape 22 or 22'.

If a trick mode such as fast forward is selected from the playback operation described immediately above, the heads of helical scan system 26 will move across the tape along a trick mode head trajectory, e.g., such as trajectory HT of FIG. 5. During this trick mode operation, the heads traverse the sequential recording tracks of the tape, e.g., as shown by trajectory HT in FIG. 5. Because of the manner in which the IA portions of the system frames are positioned on the tape, the heads will read only IA data. This data is processed by inverse transcoder 30 to construct output signal frame data and a video output signal as described above. The video output signal can be communicated to a digital TV and displayed to produce a TV image that, although imperfect, is acceptable to the viewer.

Additional advantages and modifications will readily occur to those skilled in the art. For example, alternative transcoder and inverse transcoder arrangements and designs are possible. The functions performed by the transcoder and inverse transcoder also could be combined into a single hardware component. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A video signal processor comprising:

a transcoder for receiving a video input signal comprising a plurality of compressed digital input signal frames, each respective input signal frame including at least one of intraframe data and interframe data at variable positions in the respective input signal frame, for separating the video input signal frames into the intraframe data and interframe data, and for constructing a corresponding plurality of system frames from the intraframe data and interframe data, each respective system frame having the intraframe data in a first portion in a first fixed position in the respective system frame, and the interframe data in a second portion in a second fixed position in the respective system frame, wherein only the first portions of only a first group of the system frames lie along a first trick mode head trajectory, and only the first portions of only a second group of the system frames lie along a second trick mode head trajectory.

2. A video signal processor as recited in claim 1, wherein the transcoder comprises:

a demultiplexer for demultiplexing the intraframe data and the interframe data for each of the input signal frames; and a multiplexer operatively coupled to the demultiplexer for time division multiplexing the intraframe data and the interframe data into the corresponding system frames.

3. A video signal processor as recited in claim 1, wherein the input signal frames are variable in length.

4. A video signal processor as recited in claim 1, wherein the system frames have a fixed length.

5. A video signal processor as recited in claim 1, wherein the first portions of the system frames have a first fixed length.

6. A video signal processor as recited in claim 1, wherein the second portions of the system frames have a second fixed length.

7. A video signal processor comprising an inverse transcoder for receiving a plurality of system frames from a recording medium, each respective system frame having a first portion having intraframe data in a first fixed position in the respective system frame, and a second portion having interframe data in a second fixed position in the respective system frame, wherein only the first portions of only a first group of the system frames lie along a first trick mode head trajectory, and only the first portions of only a second group of the system frames lie along a second trick mode head trajectory, for separating the system frames into the intraframe data and interframe data, and for constructing a video output signal comprising a plurality of compressed digital output signal frames corresponding to the plurality of system frames, each respective output signal frame including at least one of intraframe and interframe data at variable positions in the respective output signal frame.

8. A video signal processor as recited in claim 7, wherein the system frames include null data, and the inverse transcoder removes the null data to construct the output signal frames as variable length frames.

9. A video signal processor as recited in claim 7, wherein the inverse transcoder comprises:
   a demultiplexer for demultiplexing the first and second portions for each of the system frames; and
   a multiplexer operatively coupled to the demultiplexer for time division multiplexing the first and second portions of each of the system frames into the corresponding output signal frames.

10. A video signal processor as recited in claim 7, wherein the system frames have a fixed length.

11. A video signal processor as set forth in claim 7, wherein the first portions of the system frames have a first fixed length.

12. A video signal processor as recited in claim 7, wherein the second portions of the system frames have a second fixed length.

13. A video signal processor as recited in claim 7, wherein the output signal frames are variable in length.

14. A video system operable with a recording medium, the video system comprising:
   a transcoder for receiving a video input signal comprising a plurality of compressed digital input signal frames, each respective input signal frame including at least one of intraframe data and interframe data at variable positions in the respective input signal frame, for separating the input signal frames into the intraframe data and interframe data, and for constructing a corresponding plurality of system frames from the intraframe data and interframe data, each respective system frame having the intraframe data in a first portion in a first fixed position in the respective system frame, and the interframe data in a second portion in a second fixed position in the respective system frame, wherein only the first portions of only a first group of the system frames lie along a first trick mode head trajectory, and only the first portions of only a second group of the system frames lie along a second trick mode head trajectory; and
   a recording head operatively coupled to the transcoder for recording the system frames onto the recording medium.

15. A video system as recited in claim 14, further comprising an inverse transcoder operatively coupled to the recording head for receiving a plurality of the system frames, for separating the system frames into the intraframe and interframe data, and for constructing a video output signal comprising a plurality of compressed digital output signal frames corresponding to the plurality of system frames, each respective output signal frame including at least one of intraframe and interframe data at variable positions in the respective output signal frame.

16. A video system as recited in claim 15, wherein the system frames include null data, and the inverse transcoder removes the null data to construct the output signal frames as variable length frames.

17. A video system as set forth in claim 15, wherein the output signal frames are variable in length.

18. A video system as recited in claim 14, wherein the input signal frames are variable in length.

19. A video system as recited in claim 14, wherein the system frames have a fixed length.

20. A video system as recited in claim 14, wherein the first portions of the system frames have a first fixed length.

21. A video system as recited in claim 14, wherein the second portions of the system frames have a second fixed length.

22. A video system operable with a recording medium, the video system comprising:
   a recording head for reading a plurality of system frames from the recording medium, each respective system frame having intraframe data in a first portion in a first fixed position in the respective system frame, and interframe data in a second portion in a second fixed position in the respective system frame, wherein only the first portions of only a first group of the system frames lie along a first trick mode head trajectory, and only the first portions of only a second group of the system frames lie along a second trick mode head trajectory; and
   an inverse transcoder for receiving the plurality of system frames, for separating the system frames into the intraframe and interframe data, and for constructing a compressed digital video output signal comprising a plurality of output signal frames corresponding to the plurality of system frames, each respective output signal frame including at least one of intraframe data and interframe data in variable positions in the respective output signal frame.

23. A video system as recited in claim 22, wherein the system frames include null data, and the inverse transcoder removes the null data to construct the output signal frames as variable length frames.

24. A video system as recited in claim 22, wherein the system frames have a fixed length.

25. A video system as recited in claim 22, wherein the first portions of the system frames have a first fixed length.

26. A video system as recited in claim 22, wherein the second portion of the system frames have a second fixed length.

27. A video system as recited in claim 22, wherein the output signal frames are variable in length.

28. A method comprising:

receiving a video input signal comprising a plurality of compressed digital input signal frames, each respective input signal frame including at least one of intraframe data and interframe data at variable positions in the respective input signal frame;

separating the input signal frames into the intraframe and interframe data;

constructing a corresponding plurality of system frames from the intraframe and interframe data, each respective system frame having intraframe data in a first portion in a first fixed position in the respective signal frame, and interframe data in a second portion in a second fixed position in the respective system frame, wherein only the first portions of only a first group of the system frames lie along a first trick mode head trajectory, and only the first portions of only a second group of the system frames lie along a second trick mode head trajectory; and writing the system frames onto a recording medium.

29. A method as recited in claim 28, wherein:

the input signal separating step includes demultiplexing the intraframe data and the interframe data for each of the input signal frames; and the system frame constructing step includes time division multiplexing the intraframe data and the interframe data into the corresponding system frames.

30. A method as recited in claim 28, wherein the input signal frames are variable in length.

31. A method as recited in claim 28, wherein the system frames have a fixed length.

32. A method as recited in claim 28, wherein the first portions of the system frames have a first fixed length.

33. A video system as recited in claim 28, wherein the second portions of the system frame have a second fixed length.

34. A method as recited in claim 28, wherein the first portions of the system frames have a first fixed length.

35. A method as recited in claim 28, wherein the second portions of the system frames have a second fixed length.

36. A method as recited in claim 28, wherein the output signal frames are variable in length.

37. A method comprising:

receiving a plurality of system frames from a recording medium, each respective system frame having intraframe data in a first portion in a first fixed position in the respective system frame, and interframe data in a second portion in a second fixed position in the respective system frame, wherein only the first portions of only a first group of the system frames lie along a first trick mode head trajectory, and only the first portions of only a second group of the system frames lie along a second trick mode head trajectory;

separating the system frames into the intraframe data and interframe data; and constructing a video output signal comprising a plurality of compressed digital output signal frames corresponding to the system frames, each respective output signal frame including at least one of intraframe and interframe data at variable positions in the respective output signal frame.

38. A method as recited in claim 37, wherein the system frames further comprise null data, and the separating step includes removing the null data.

39. A method as recited in claim 37, wherein the output signal constructing step includes:

time division multiplexing the intraframe and interframe data into the corresponding output signal frames.

40. A method as recited in claim 37, wherein the system frames have a fixed length.

41. A video signal processor comprising:

a transcoder for receiving a video input signal comprising a plurality of compressed digital input signal frames including at least one of intraframe data and interframe data at variable positions in the respective input signal frame, for separating the video input signal frames into the intraframe and interframe data, and for constructing a corresponding plurality of system frames from the intraframe and interframe data, each respective system frame having the intraframe data in a first portion in a first fixed position in the respective system frame, the first portion having a first length corresponding to a maximum amount of intraframe data projected to be present in any input signal frame, and the interframe data in a second portion in a second fixed position in the respective system frame, the second portion having a second length corresponding to a maximum amount of interframe data projected to be present in any input signal frame, the system frames to be recorded on a recording medium wherein only the first portions of only a first group of the system frames lie along a first trick mode head trajectory, and only the first portions of only a second group of the system frames lie along a second trick mode head trajectory.

42. A video system operable with a recording medium, the video system comprising:

a transcoder for receiving a video input signal comprising a plurality of compressed digital input signal frames including at least one of intraframe data and interframe data at variable positions in the respective input signal frame, for separating the video input signal frames into the intraframe and interframe data, and for constructing a corresponding plurality of system frames from the intraframe and interframe data, each respective system frame having the intraframe data in a first portion in a first fixed position in the respective system frame, the first portion having a first length corresponding to a maximum amount of intraframe data projected to be present in any input signal frame, and the interframe data in a second portion in a second fixed position in the respective system frame, the second portion having a second length corresponding to a maximum amount of interframe data projected to be present in any input signal frame; and a recording head operatively coupled to the transcoder for recording the system frames onto the recording medium, wherein only the first portions of only a first group of the system frames lie along a first trick mode head trajectory, and only the first portions of only a second group of the system frames lie along a second trick mode head trajectory.

43. A video system as recited in claim 42, further comprising an inverse transcoder operatively coupled to the recording head for receiving a plurality of the system frames, for separating the system frames into the intraframe and interframe data, and for constructing a video output signal comprising a plurality of compressed digital output signal frames corresponding to the plurality of system frames, each respective output signal frame including a least one of intraframe and interframe data at variable positions in the respective output signal frame.

* * * * *